United States Patent

Livingston

[11] Patent Number: 6,057,536
[45] Date of Patent: *May 2, 2000

[54] LASER ALONG BODY TRACKER (SABOT II)

[75] Inventor: Peter M. Livingston, Rancho Palos Verdes, Calif.

[73] Assignee: TRW Inc., Redondo Beach, Calif.

[*] Notice: This patent is subject to a terminal disclaimer.

[21] Appl. No.: 08/995,333

[22] Filed: Dec. 22, 1997

Related U.S. Application Data

[63] Continuation-in-part of application No. 08/729,108, Oct. 11, 1996, Pat. No. 5,955,724.

[51] Int. Cl.$^7$ .................................................. G01S 17/66
[52] U.S. Cl. ........................... 250/203.2; 809/41.06; 250/203.6
[58] Field of Search ........................ 250/203.1, 203.2, 250/203.3, 203.6, 225, 234, 235; 356/4.01, 5.09, 5.11; 89/41.01, 41.06

[56] References Cited

U.S. PATENT DOCUMENTS

| | | |
|---|---|---|
| 4,047,816 | 9/1977 | Pell et al. . |
| 4,063,819 | 12/1977 | Hayes . |
| 4,123,165 | 10/1978 | Brown et al. . |
| 4,259,009 | 3/1981 | Jernigan . |
| 4,687,281 | 8/1987 | Gross . |
| 5,198,607 | 3/1993 | Livingston et al. . |
| 5,216,236 | 6/1993 | Blais . |
| 5,253,033 | 10/1993 | Lipchak et al. . |
| 5,780,838 | 7/1998 | Livingston et al. ................. 250/203.2 |
| 5,900,620 | 5/1999 | Livingston ............................ 250/203.2 |
| 5,918,305 | 6/1999 | Livingston ................................ 89/1.11 |

OTHER PUBLICATIONS

Peter M. Livingston, et al., "Laser Beam Active Tracking for Specular Objects to λ/D", *Applied Optics*, vol. 24, No. 13, Jul. 1, 1995, pp. 1919–1925.

Ahmed Erteza, Boresighting a Gaussian Beam on a Specular Target Point: A Method Using Conical Scan:, *Applied Optics*, vol. 15, No. 3, Mar. 1976, pp. 656–660.

*Primary Examiner*—John R. Lee
*Attorney, Agent, or Firm*—Michael S. Yatsko

[57] ABSTRACT

A non-imaging laser-based tracking system for tracking the position of a targeted moving object. The tracking system includes two lasers: a reference laser and a slave laser. Each laser is a weapon, and when locked on a target, single laser effectiveness may be doubled without a thermal blooming performance loss associated with a single laser operating at twice the power. The slave laser beam is dithered relative to the reference laser beam in a direction along the longitudinal axis of the target. The system includes an optical receiver for repetitively scanning the irradiance profile reflected by the target. Since the slave laser beam is dithered relative to the reference laser beam, both laser beams will jitter and drift together providing a gain factor of two in average irradiance on the moving target.

7 Claims, 9 Drawing Sheets

LASER ALONG BODY TRACKER (SABOT II)

CROSS-REFERENCE TO RELATED APPLICATIONS

This application is a continuation-in-part of parent patent application, Ser. No. 08/729,108 filed on Oct. 11, 1996 for a LASER ALONG BODY TRACKER (SABOT I), by Peter M. Livingston, now U.S. Pat. No. 5,955,724.

The present application is related to issued U.S. Pat. No. 5,900,620, issued May 4, 1999, entitled: "Magic Mirror Hot Spot Tracker" by Peter M. Livingston, and its contents are incorporated herein by reference.

BACKGROUND OF THE INVENTION

1. Field of the Invention

The present invention relates generally to systems for tracking a moving object and, more particularly, to a laser-based system for tracking a moving object that employs two lasers; a reference and slave laser. Each laser is a weapon, and when locked together on a target, single laser effectiveness may be doubled without a thermal blooming performance loss associated with a single laser operating at twice the power. The slave laser is dithered relative to the reference laser in a direction along a longitudinal axis of the target. The system includes an optical receiver for repetitively scanning the irradiance profile reflected by the target.

2. Description of the Prior Art

Various types of systems are known for tracking moving objects, such as rockets and missiles. Such systems can be categorized as either imaging or non-imaging systems. Conventional imaging type systems normally utilize an imaging device, such as an electronic camera, for detecting and tracking the position of a targeted moving object. While such imaging systems are effective in tracking targeted moving objects, such imaging systems; are known to have limitations when used in combination with high power laser beam weaponry. For example, in such systems, the high power laser beam is known to interfere with the imaging system potentially causing loss of the track of the targeted moving object. Although various systems are known for compensating for such an interference problem, such systems do not effectively eliminate the interference.

As such, non-imaging laser type tracking systems have been developed. An example of such a system is disclosed in copending U.S. patent application Ser. No. 08/631,645, filed on Apr. 2, 1996, now U.S. Pat. No. 5,780,838, entitled LASER CROSS BODY TRACKER (LACROSST), assigned to the same assignee as the assignee in the present invention. The system disclosed in the '645 patent application includes a laser generator for generating a single beam of laser energy and a beam steerer for steering the beam of laser energy to track a targeted moving object. The beam steerer steers the beam of laser energy in a oscillatory fashion in two orthogonal directions at a first dither frequency and a second dither frequency, respectively. The system also includes a telescope for receiving reflected laser energy from the targeted object and detecting the amount of reflected energy received. The detected energy is filtered to form first and second dither frequencies for each channel. The filtered signals are synchronously detected by multiplying each channel by a sinusoidal function derived from the laser mirror generator for that channel. A bias signal is generated from the received reflected synchronously detected power proportional to the beam centroid displacement from the target midline which allows the beam steerer to steer the laser beam to center it on the target, thereby tracking the targeted object.

Unfortunately, laser based tracking systems are subject to what is known as thermal blooming. Thermal blooming results in a change in the refractive index of the beam path as a result of heating the beam path temperature by the laser. A change of the refractive index creates a lens effect that causes the laser radiation to spread relative its original direction. As such, thermal blooming increases the diameter of the laser beam as it moves away from the laser source. A detailed explanation of the thermal blooming is disclosed in U.S. Pat. No. 5,198,607, hereby incorporated by reference.

The problem of thermal blooming also reduces the effectiveness of high power laser weaponry. In order to overcome the thermal blooming problem for high power laser weaponry, the '607 patent discloses the use of two independent lasers separated by a sufficient distance to prevent interference therebetween, focused onto a single moving object, such as a missile. The '607 patent discloses the use of a known imaging type system for tracking the location of the targeted moving object. However, the two laser beams are not under closed loop control in the system disclosed in the '607 patent, thereby making it relatively difficult to direct both laser beams to a single spat on the target.

SUMMARY

It is an object of the present invention to solve various problems of the prior art.

It is yet another object of the present invention to provide a non-imaging tracking system for tracking the position of a targeted moving object.

It is yet another object of the present invention to provide a non-imaging type tracking system which reduces the effects of thermal blooming.

Briefly, the present invention relates to a non-imaging laser based tracking system for tracking the position of a targeted moving object. The tracking system includes two lasers: a reference laser and a slave laser. Each laser is a weapon, and when locked together on a target, single laser effectiveness may be doubled without a thermal blooming performance loss associated with a single laser operating at twice the power. The slave laser beam is dithered relative to the reference laser beam in a direction along the longitudinal axis of the target. The system includes an optical receiver for repetitively scanning the irradiance profile reflected by the target. Since the slave laser beam is dithered relative to the reference laser beam, both laser beams will jitter and drift together providing a gain factor of two in average irradiance on the moving target.

BRIEF DESCRIPTION OF THE DRAWING

These and other objects and advantages of the present invention will become readily apparent upon consideration of the following detailed description and attached drawing, wherein.

DETAILED DESCRIPTION

Figure 1:
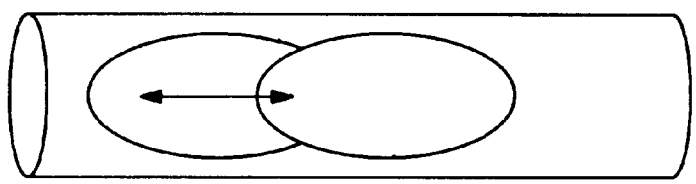
FIG. 1 is a diagram illustrating the reflected radiation from a uniformly reflecting body illustrating two overlapping laser spots.
Figures 2A, 2B:
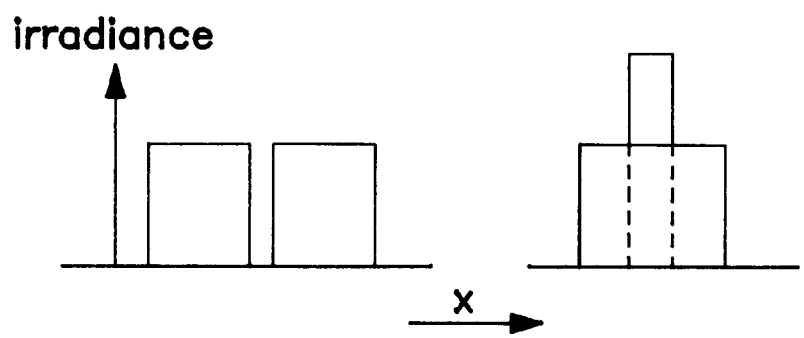
FIG. 2A is a graphical representation of the irradiance profile as a function of the distance along the reflected body for two non-overlapping laser spots.
FIG. 2B is a graphical illustration of the irradiance profile as a function of the distance along the reflecting body where the two overlapping laser spots are overlapping as illustrated in FIG. 1.

The present invention relates to a non-imaging laser based tracking system for tracking a targeted moving object. In order to minimize the effects of thermal blooming, the tracking system in accordance with the present invention employs two laser beams to detect the location of a targeted moving object. One laser beam is configured as a reference beam and is directed toward the targeted moving object. The other laser beam is configured as a slave and is dithered (oscillated with a small amplitude) relative to the reference laser beam on the target surface in a direction generally parallel to a longitudinal axis of the target. As shown in FIG. 1, such a system will result in overlapping laser spots on the moving target. Since the reference and slave laser beams are locked together, both beams will jitter and drift together producing a gain in the average irradiation profile of two as illustrated in FIG. 2B. More particularly the irradiance for separated laser spots on a target is illustrated in FIG. 2A. By causing the laser spots on the target to overlap as illustrated in FIG. 1, the irradiance gain illustrated in FIG. 2B is about twice the normal gain as illustrated in FIG. 2A assuming equidistant laser paths and equal laser powers.

Figure 3:
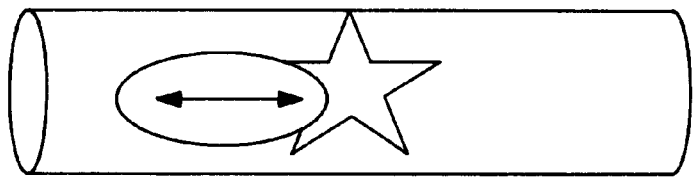
FIG. 3 is a diagram of a single laser beam overlapping a highly reflecting feature on a target.

FIGS. 1 and 2 illustrate the irradiation for a uniformly reflecting body. FIG. 3 illustrates the use of the invention with a non-uniformly reflection body. In particular, referring to FIG. 3 a single laser beam can be locked on to shiny or dull feature of a target. Even though the total number of photons scattered from the target is constant, the invention will process the information as to lock the single beam onto the distinguishing feature as will be discussed in more detail below.

A system for directing a reference laser beam at the target of interest is described in U.S. Pat. No. 5,780,838 assigned to the same assignee as the assignee of the present invention and hereby incorporated by reference. The present invention as described below is related to locking a second laser beam (slave beam) relative to the reference laser beam on the target surface in a direction generally parallel to the longitudinal axis of the target.

Figure 4:
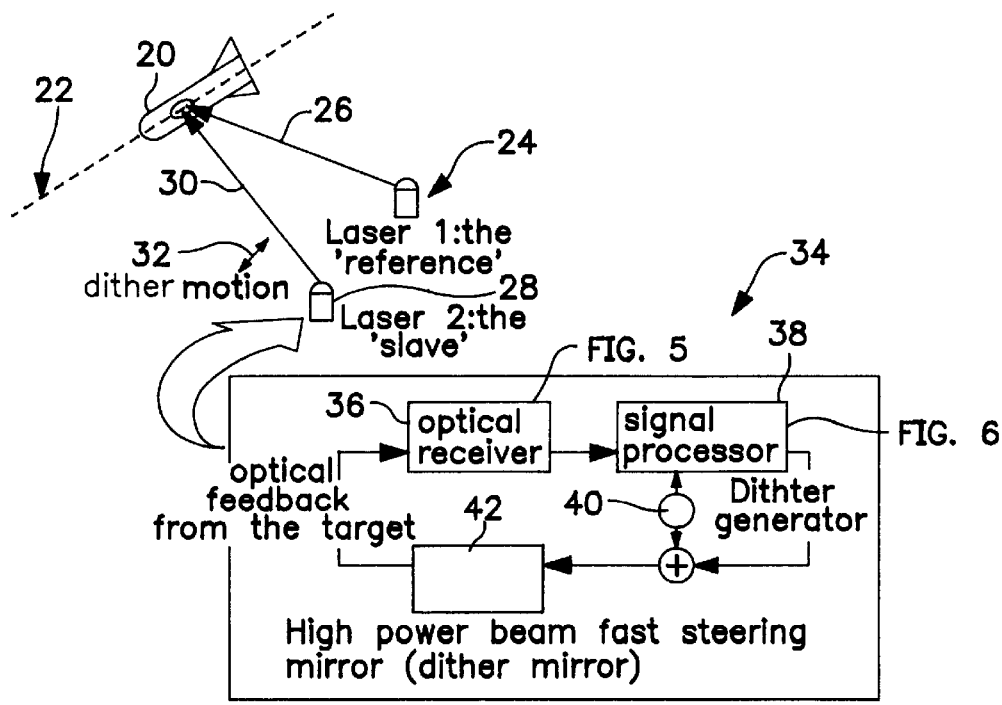
FIG. 4 is an overall block diagram of the non-imaging laser tracking system in accordance with the present invention.

Referring to FIG. 4, a targeted moving object such a missile or rocket 20 is illustrated defining a longitudinal axis 22. A first laser 24 is used to direct a first laser beam 26 toward the target 20. For purposes of illustration herein, the first laser 24 is designated as the reference laser. In accordance with an important aspect of the invention, a second laser 28 is used to direct to a second laser beam 30 toward the target. The second laser beam 30 is dithered (i.e. oscillated with a relatively small amplitude) in a direction as indicated by the arrows 32 that is generally parallel to the longitudinal axis 22 of the target.

The tracking system forms a closed loop that forces the laser spots from the laser beams 26 and 30 to overlap as illustrated in FIG. 1 for all disturbance frequencies falling within the loop bandwidth. The closed loop system in accordance with the present invention is generally identified with the reference numeral 34 and includes an optical receiver 36, a signal processor 38, a dither generator 40 and a dither mirror 42. Unlike the single laser tracking system disclosed in the copending application Ser. No. 08/631,645 for the LASER CROSS-BODY TRACKER (LACROSST), now U.S. Pat. No. 5,780,838 the tracking system 34 does not depend on the time variation of the total number of scattered photons but rather information derived competitively scanning the irradiance profile created the two laser beams 26 and 30 directed toward the target 20. The signal processor 38, as will be discussed below in more detail is used to process the scan data from the optical receiver 36 in order to lock the beam 30 from the slave laser 28 to the beam 26, generated by the reference laser 24.

Figure 5:
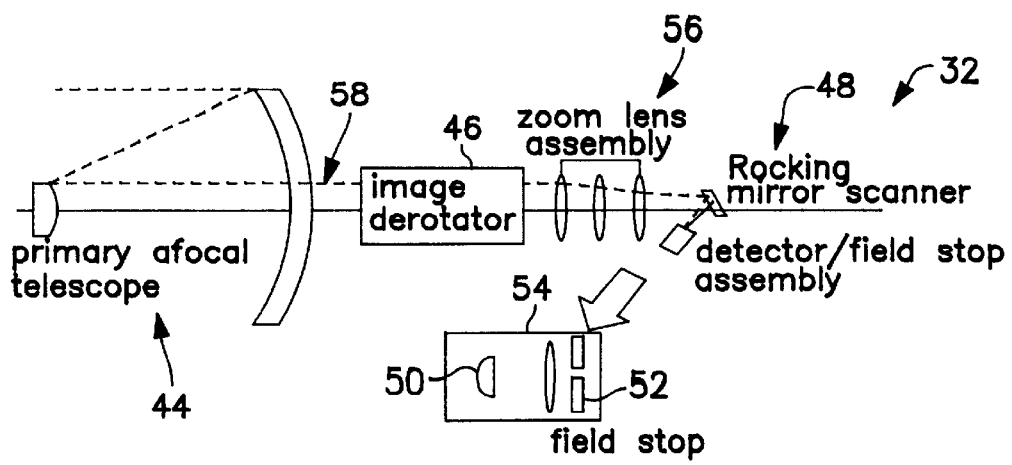
FIG. 5 is a block diagram of an optical receiver and image derotator in accordance with the present invention.

The optical receiver 36 is illustrated in detail in FIG. 5. The optical receiver 36 is used to detect the irradiance profiles for example as illustrated in FIG. 2B, reflected from the target 20 by imaging a target 20 with its laser spots at the laser site using a rocking mirror scanner assembly as discussed below. The optical receiver 36 includes a primary afocal telescope 44 for receiving scattered laser energy from a relatively wide field-of-view, for example, a field of regard of several hundred microradians. The scattered laser energy from the target 20 is directed by the afocal telescope 44 to an image derotator 46. The image derotator 46 is used to cause a rocking mirror scanner assembly 48 to scan the scatter laser energy in a direction generally parallel to the longitudinal axis 22 of the target 20. More particularly, the optical receiver 36 includes a single detector 50 having a field stop slit 52 which defines the system instantaneous field-of-view. The rocking mirror scanner assembly 48 causes the image of the overlapping spots on the target 20 to be swept over the slit 52. The image derotator 46 thus is used to force the dither direction to be generally perpendicular to the field stop slit 32. The field lens 54 is used to direct the image on the single detector 50. In order to improve the signal to noise ratio, a zoom lens assembly 56 may be used in conjunction with a system radar represented by the dashed line 58, to fill the field stop slit 52 to the greatest possible extent. In order to ensure that the spot image on the detector 50 remains centered, bias signals from the signal processing system 38 may be used. The bias signals may be generated by the signal processing system 38 resulting from the action of the tracking system servoloop 34. The action of the servoloop causes the optical signal to be centered on the detector and eliminates signal drift perpendicular to the direction of scan.

The optical receiver 36 may be mounted to the coarse gimbals of a laser beam pointer system. The laser beam pointer system is described in detail in U.S. patent application Ser. No. 08/631,645, filed on Apr. 2, 1996, now U.S. Pat. No. 5,780,838, assigned to the same assignee as the present invention and hereby incorporated by reference.

Figure 11:
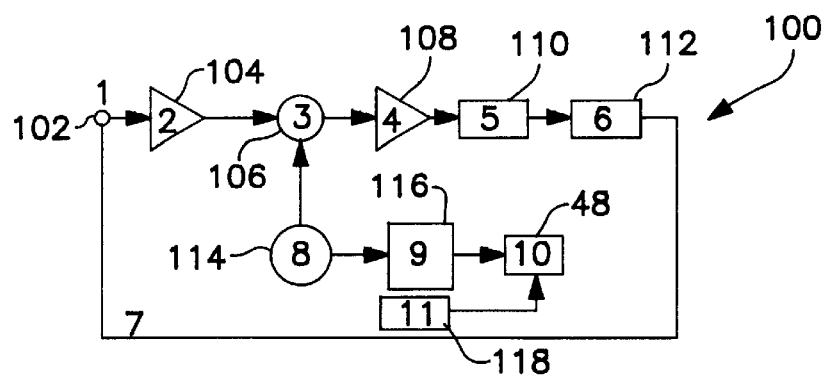
FIG. 11 is a block diagram of an alternative signal processor for use with the tracking system in accordance with the present invention.

Various signal processing systems are suitable for use with the present invention. One such signal processing system is identified with the reference numeral 38 and illustrated in FIG. 6. An alternate signal processing system is illustrated in FIG. 11 and discussed below.

Figure 6:
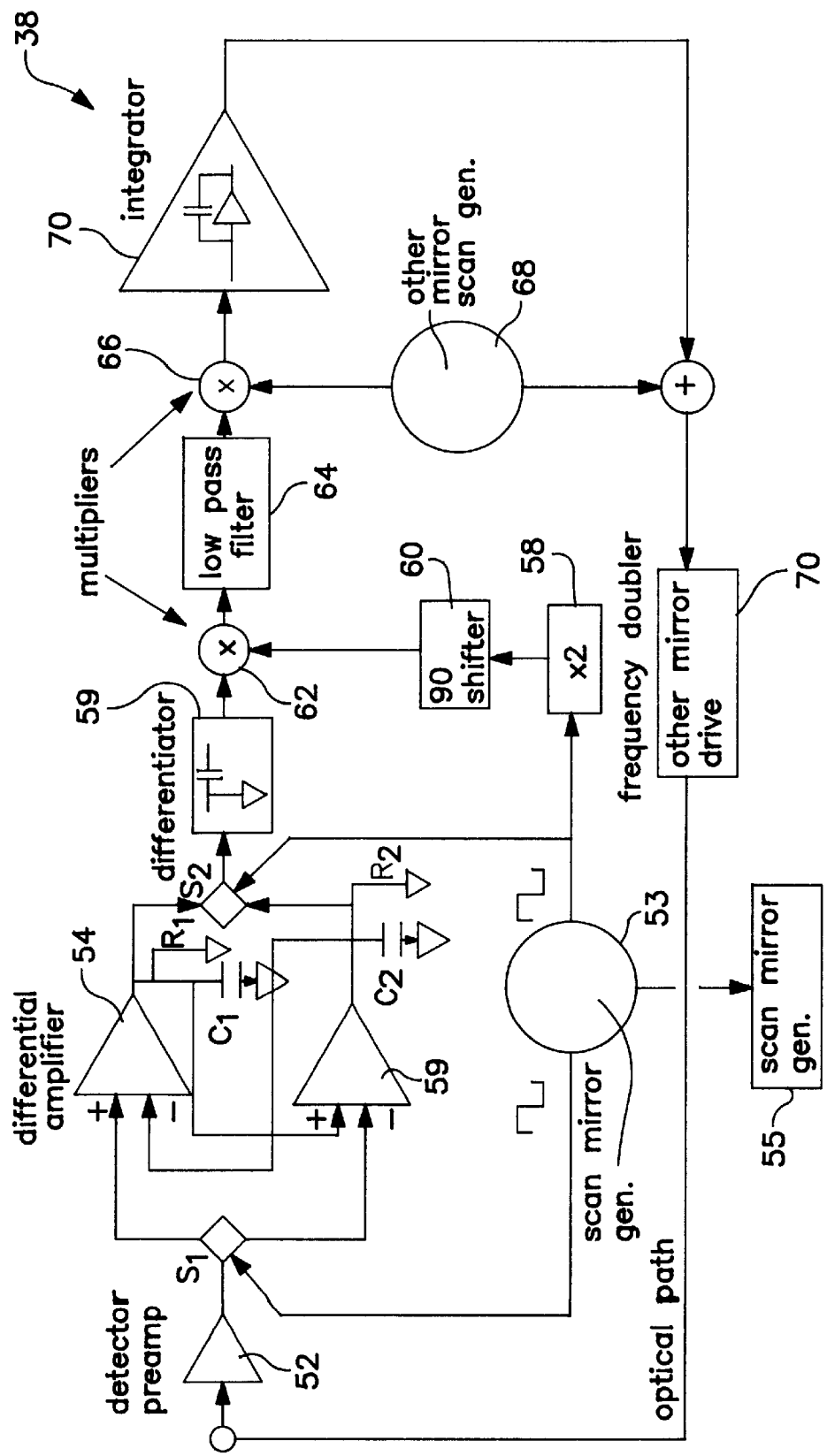
FIG. 6 is a block diagram of a signal processor for use with the tracking system in accordance with the present invention.

Referring to FIG. 6, scan mirror generator 53 (FIG. 6) as well as the scan mirror drive 55 form part of the signal processor 38 discussed below which drives the rocking mirror scanning assembly 48. The scan mirror generator 53 causes the scan mirror to move an approximately constant angular rate scanning the image back and forth over the fixed slit 52. The detector 50 thus records a voltage proportional to the irradiance filling the slit 52. The slit width and scan extend together with the zoom lens assembly 56 causes the image to be moved completely out of the field of view and returned. The detected voltage from the detector 50 thus represents a running integral of the irradiance distribution.

Figure 7A:
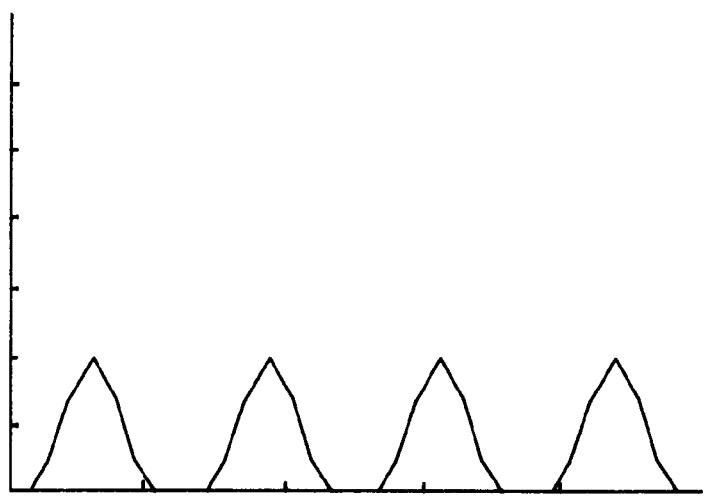
FIG. 7A is a graphical illustration of the received scan signal for four complete scan cycles of the tracking system in accordance with the present invention.

The output from the detector 50 is applied to a detector preamplifier 52. The signal processor 38 is used to develop a scan signal for each complete scan cycle as illustrated in FIG. 7A. The signal processor 38 includes a pair of differential amplifiers 54 and 56 as well as a pair of commutating switches $s_1$ and $s_2$. As mentioned above, the scan mirror moves at a constant angular rate scanning the image back and forth over the fixed slit 52. In a forward scanning direction, the commutating switches $s_1$ and $s_2$ cause the signal to be applied to the differential amplifier 54. In particular, when the commutating switch $s_1$ is closed, a signal from the detector/preamp 52 is applied to a noninverting input of a differential amplifier 54 and compared with the output of the differential amplifier 56 which is zeroed by a capacitor $c_2$, connected between the output of the differential amplifier 56 and ground. A discharge resistor $R_2$ is used to discharge the capacitor such that output of the differential amplifier 56 is zero when the commutating switch $s_1$ is closed. Thus when the commutating switch $s_1$ is closed, the signal from the detector/preamplifier 52 will be positive. The commutating switch $s_2$ is used to connect the output of the differential amplifier 54 to a differentiator 56 in the forward direction of the scan cycle to produce the portion of the signal illustrated in FIG. 7A with a positive slope.

In the return direction of the scan cycle, the commutating switch $s_1$ causes the signal from the detector/preamplifier to be connected to an inverting input of the differential amplifier 57. As mentioned above, the capacitor $c_2$ in combination with the discharge resistor $R_2$ causes the output of this amplifier to be zero prior to the rocking mirror scanning assembly 48 moving in a return direction a noninverting input of the differential amplifier 57 is connected to the output of the differential amplifier 54. In a return direction, a capacitor $c_1$ and parallel connected discharge resistor $R_1$ force the output of the differential amplifier to be zero in the return direction. Thus, in a return direction, the detector preamp signal 52 is merely inverted as illustrated by the negative slope of the scan signal for the last half cycle as illustrated in FIG. 7.

The scan mirror generator 53 is connected between the commutating switches $s_1$ and $s_2$ to control their operation. More particularly, the scan mirror generator 53 is coupled to a scan mirror drive which, as discussed above causes the rocking mirror scanner assembly 48 to scan the image back and forth over the fixed slit 52. The scanning mirror generator 53 also controls the operation of the commutating switches $s_1$ and $s_2$ as discussed above. The waveform illustrated in FIG. 7A, shown for four complete scan cycles is thus produced at the output of the commutating switch $s_2$.

Figure 7B:
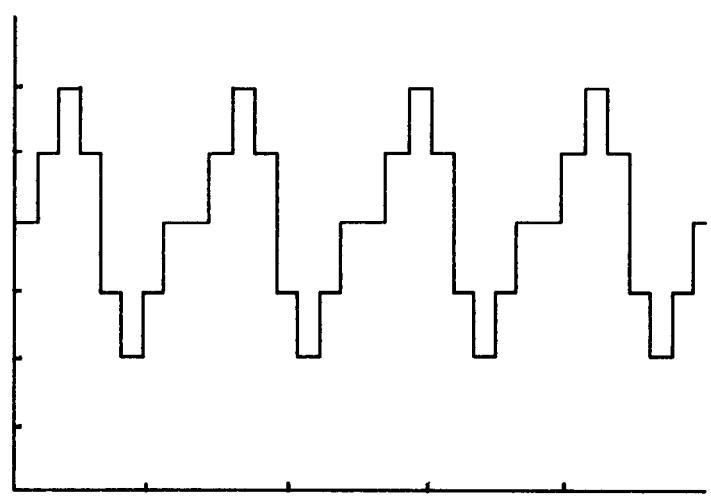
FIG. 7B is a differentiated version of the signal illustrated in FIG. 7A.

A scan signal, as illustrated in FIG. 7A, is applied to the differentiator 59. The differentiator 59 differentiates the scan signal to produce a differentiated scan signal as illustrated in FIG. 7B. Except for the line reversal of the odd half cycles, the differentiated scan signal illustrated in FIG. 7B is similar to the irradiance profile for partially overlapping laser spots on a target illustrated in FIG. 2. Since the differentiation eliminates the DC component, operation of the system does not depend on accurate DC restoration.

After the scan signal is differentiated, the dither modulation portion of the signal, which shows up an FM component, is recovered. In particular the differentiated signal illustrated in FIG. 7B is synchronously detected by multiplying it with a cosine signal from the scan mirror generator 53. More particularly, referring to FIG. 6, the output of the scan of mirror generator 53 is applied to a frequency doubler 58. The output of the frequency doubler 58 is essentially a sine wave at twice the sweep frequency of the scan mirror generator 53. The output of the frequency doubler 58 is applied to a 90° phase shifting device 60 which, generates a cosine signal at twice the sweep rate. The output of the phase shifter device is applied to a multiplier 62.

Figure 8:
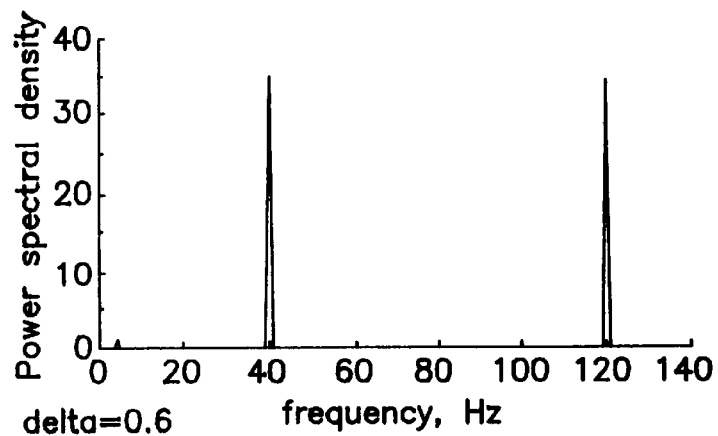
FIG. 8 is a graphical illustration of the power spectral density of the synchronously detected scan signal at twice the frame rate for the tracking system in accordance with the present invention.

The power spectral density of the synchronously detected scan signal at twice the frame rate is illustrated in FIG. 8 at a 0.6 beam width separation. As shown in FIG. 8, the frame rate is 40 frames or 80 scans per second. Thus, for a scan rate of 80 Hz synchronous detection only detects the sidebands 40 Hz above and below the 80 Hz above and below the 80 Hz signal within the synchronously detected differentiated scan signal at the dither frequency of 5 Hz.

The synchronously detected differentiated scan signal is applied to a low pass filter 64 as illustrated in FIG. 6. The output of the low pass filter 64 is applied to another multiplier 66 used for synchronous detection at the dither frequency to recover the signed envelope of the dither signal. A signal from a dither mirror scan generator 68 is applied to the multiplier 66. The dither mirror scan generator 68 is used to drive a dither mirror drive 70, which, in turn, drives the dither mirror and, in turn, the slave beam 30 at the dither frequency.

Figure 9:
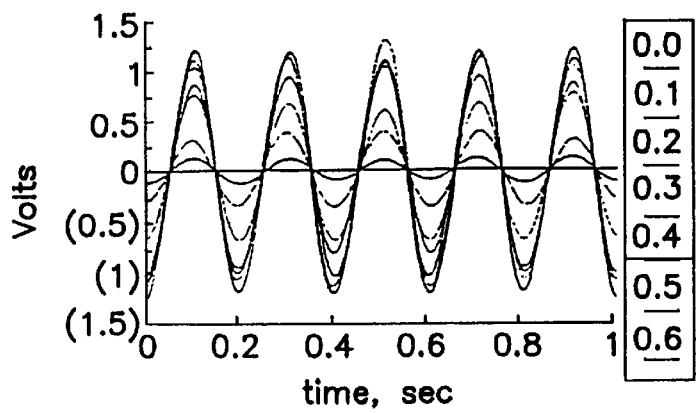
FIG. 9 is a graphical illustration of the detected dither modulation signal for the tracking system in accordance with the present invention.

FIG. 9 illustrates five synchronously detected 5 modulation signals shown for 7 values of spot separation 0.0 through 0.6 at 0.1 increments. As shown, the dither modulation envelopes illustrated in FIG. 9 are signed. Thus, referring to FIG. 1, if the dithered spot is to the left of the reference spot and moves toward it as the high power beam fast steering mirror 42 (FIG. 4), moves from left to right, the envelope sign is positive. However, if the dither spot is to the right of the reference spot, the same motion of the high power fast steering mirror 42 causes the sign to be negative.

Figure 10:
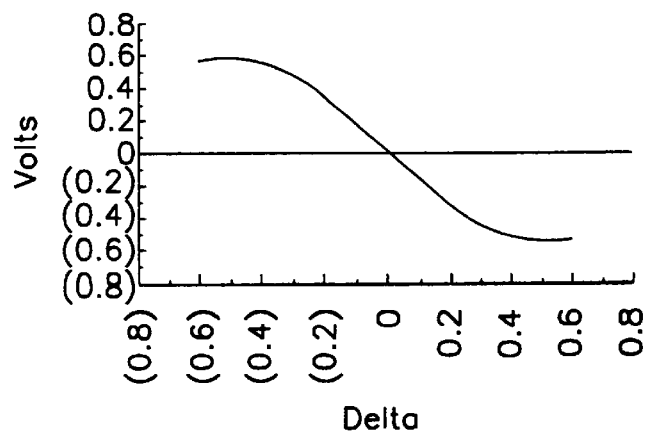
FIG. 10 is a graphical illustration of an error characteristic signal following the second detection of the 5 Hz dither modulation signal.

The sign of the dither modulation signal then may be used as an error signal to lock the reference beam 30 from the slave laser 28 relative to the reference beam 26 from the reference laser 24. As shown in FIG. 10, the error signal changes magnitude with the mean spot displacement measured in beam radii. FIG. 10 is an example of the detected 5 Hz dither modulation signal recovered for seven values of mean spot displacement. As shown in FIG. 10, the system will cause the beam 30 to walk onto the reference beam 26 for least plus or minus 0.6 beam-radius separations. As shown in FIG. 6, this detected signal is applied to an integrator 70 which forms a closed loop with the dither mirror scan generator 68 to drive the dither mirror with a signal proportional to the integral of the detected envelope.

Figure 18:
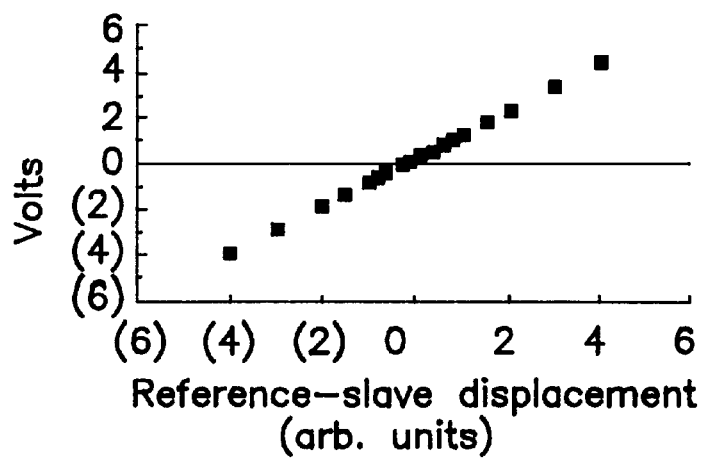
FIG. 18 is a graphical illustration of the error signal as a function of the reference slave spot displacement.

As discussed above, an alternate signal processing system, generally identified with the reference numeral 100, is illustrated in FIG. 11. In this system, light enters the detector 102 after being gathered by the primary afocal telescope 44 (FIG. 5) reflected by the scan mirror 48 and passed through the fixed slit 52. The detector 102 (FIG. 11) converts the optical signal to a corresponding electrical intensity signal which, in turn, is amplified by a detector preamplifier 104 and multiplied by a sinusoid by way of a multiplier 106 to form a product signal. The output signal from the multiplier 106 is applied to an integrator 108 whose output is filtered by a filter 110, for example, a low pass 8-pole Butterworth filter, for example as disclosed in "Filtering In The Time and Frequency Domains", by H. J. Blinchikoff and A. I. Zverev, John Wiley and Sons, New York, 1975, chapter 3.4, "Maximally Flat Filters", hereby incorporated by reference. The output of the filter 110 is applied to a driver 112 for driving the scan mirror 48 (FIG. 5) to provide closed loop control of the scan mirror 48 based on spatial difference of the reflected radiation of the slave and reference beam spots detected by the detector 102. More particularly, the output of the integrator 108 forms an error signal which can be used to drive the scan mirror 48. As will be discussed in more detail below, when the slave and reference spots 122 are superimposed, the output of the integrator 108 is zero. However, when the reference and slave spots are not superimposed, the output of the integrator 108 is a positive or negative error signal as illustrated in FIG. 18 which drives the scan mirror 48 under closed loop control until reference and slave spots are superimposed in which case the error signal is zero.

The signal processing system 100 includes a sinewave generator 114, used to multiply the detector signal to form a product signal. The sinewave generator 114 is also used to drive a sawtooth generator 116. The sawtooth generator 116 is used to drive the scan mirror 48 as discussed above. A mirror offset bias 118 allows for adjustment of the center to center the selected reference image in the mirror scan.

Figure 12:
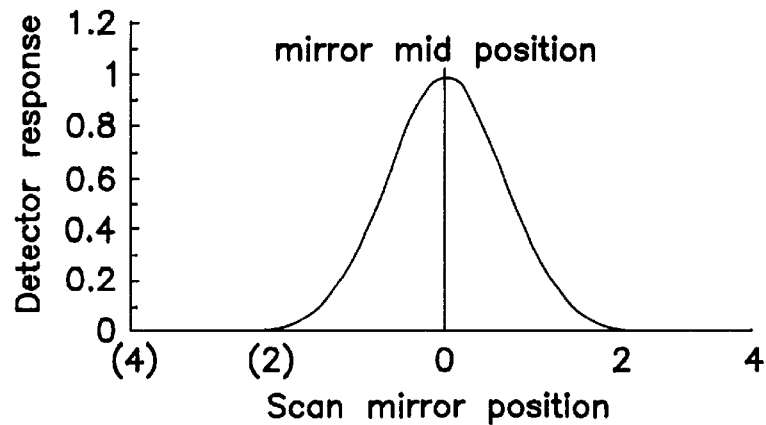
FIG. 12 is a graphical illustration of the scan mirror position as a function of detector voltage for the signal processor illustrated in FIG. 11 for a condition when the reference and slave spots are perfectly superimposed.
Figure 13:
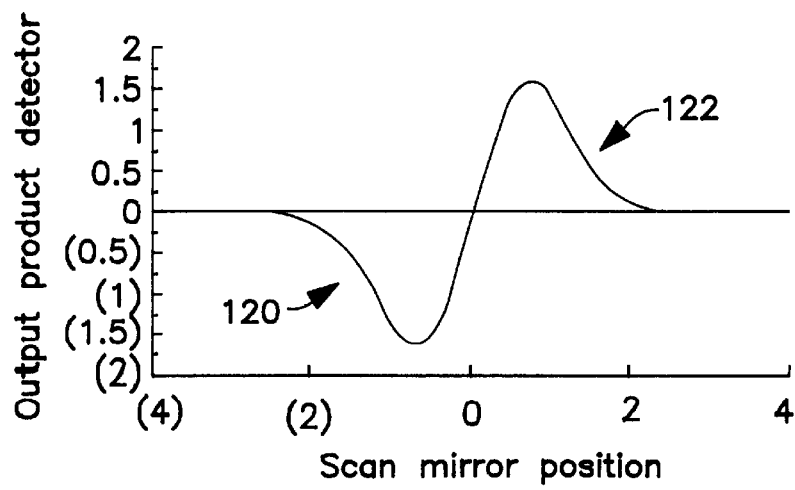
FIG. 13 is similar to FIG. 12 but illustrating the detector voltage signal of FIG. 12 multiplied by a phase lagged sine signal operating at the scan mirror frequency.

Multiplying the detector signal by a sinusoid allows for synchronous detection by dividing the detector signals in the two halves 120 and 122 as shown in FIG. 13. The sign of the sinusoid is not important. Either an in-phase sinusoid or a sinusoid 180° out of phase relative to the mirror may be used. As illustrated herein, the sinusoid selected is 180° out of phase for illustration. Referring to FIG. 12, the detector output voltage as a function of scan mirror position is illustrated for a condition when the reference and slave spots are perfectly superimposed over one another. As mentioned above, the detector signal is multiplied by a sinusoid to form a product signal. As shown in FIG. 13, the sinusoid is selected to 180° out of phase with the mirror in order to divide tie product signal into two halves; a first half 120 and a second half 122. During the condition when the reference and slave spots are superimposed, the first half 120 of the product signal, assuming that the sinusoid is 180° out of phase with the mirror, is negative. Conversely, the second half 122 of the product signal is positive. As shown in FIG. 13, the product signal is proportional to the first derivative of the output signal from the detector 102 and, as shown, is formed from the equal positive and negative halves 120 and 122 during an integration period. As mentioned above, the output of the multiplier 106 is then integrated by an integrator 108. For the condition illustrated in FIG. 12, since the areas of the first half 120 and second half 120 of the product signal are equal but complementary, the output of the integrator 108 will be 0 during this condition.

It is to be understood that either spot can serve as a reference or a slave spot. The reference is selected by adjusting the bias to center the reference spot so that its peak occurs exactly one half of the total sweep distance. The other half is designated as the slave. Since either laser can be chosen as a slave, both must be equipped with a suitable fast beam steering assembly but only one need be equipped with the optical receiver 36 illustrated in FIG. 5.

Figure 14:
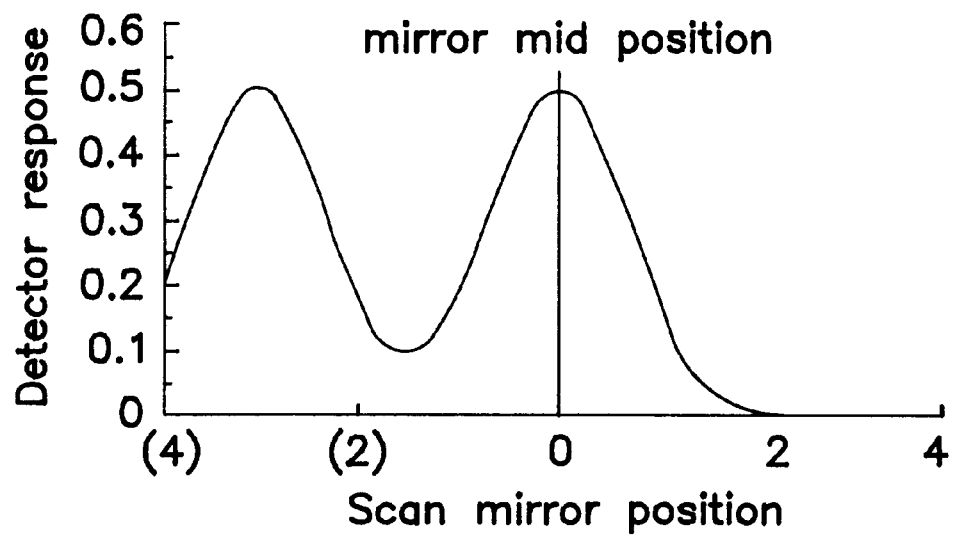
FIG. 14 is similar to FIG. 12 but for the condition when the slave spot leads the reference spot.
Figure 15:
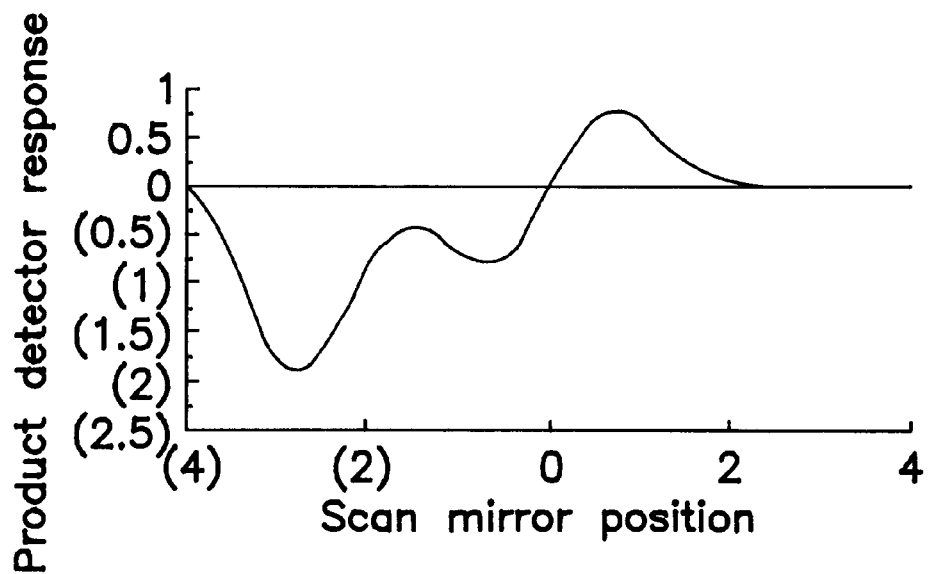
FIG. 15 is similar to FIG. 13 illustrating the detector voltage signal of FIG. 14 multiplied by a phase lagged sine signal operating at the scan mirror frequency.
Figure 16:
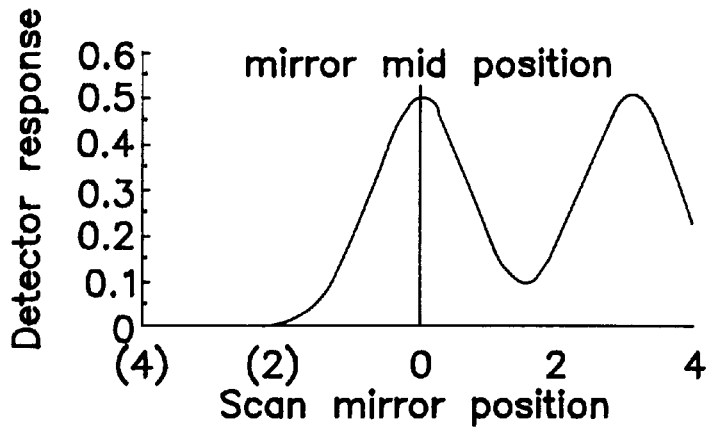
FIG. 16 is similar to FIG. 12 but for a condition when the slave spot lags the reference spot.
Figure 17:
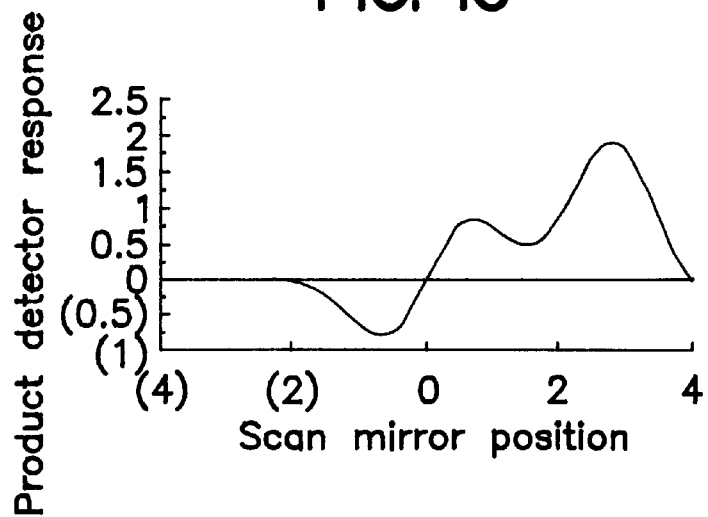
FIG. 17 is similar to FIG. 13 but for the condition when the slave spot lags the reference spot.

FIGS. 14 and 16 illustrate alternate conditions when the reference and slave spots are not perfectly aligned. In particular, in FIG. 14 illustrates condition when the slave spot leads the reference spot. FIG. 16, illustrates the condition when the slave spot lags the reference spot. As shown in FIGS. 15 and 17 multiplying the detector 102 output signals by an out of phase sinusoid will result waveforms whose average value is not 0, unlike the condition illustrated in FIG. 12. Thus, in these conditions, the output of the integrator 108 will provide an error signal as a function of the displacement of the reference and slave spots producing an error characteristic, for example, as illustrated in FIG. 18 to cause the slave spot to move in the direction of the reference spot.

Figure 19:
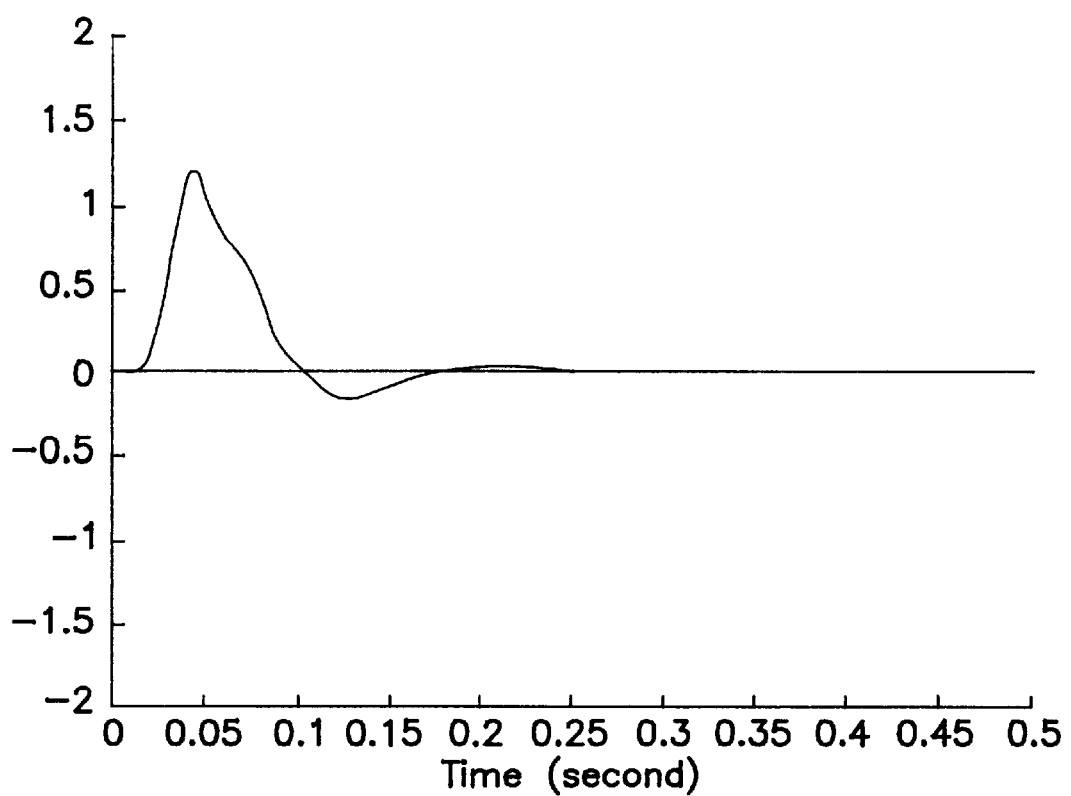
FIG. 19 is a graphical illustration of the settling characteristics of the system illustration in FIG. 11 at a time t=o.

FIGS. 12–18 are based on the following data: scan rate: 400 radians per second; loop gain 70, mirror extent: −4 to +4; capture range limited to + or −4 displacement units. The actual capture range may somewhat greater than + or −4. However, the error characteristic turns over approaching 0 at the extremes. As a result, the settling time of the closed loop at the extremes becomes very long as the slave spot disappears out of the scanner mirror field of regard as generally illustrated in FIG. 19 which illustrates the settling time of the loop at time t=0.

The principles of the invention are applicable to systems having more than two lasers. In such an application, laser beams with a unique tag are used to distinguish them. For example, a typical mid infrared range chemical laser is known to have eight strong lines. In such an application, eight independent identical chemical lasers with the seven detectors and processor assemblies as illustrated in FIGS. 5 and 11 are used. Each assembly is coded for one common reference and a slave by placing a dual bandpass optical filter in front of the detector that passes only the laser line wavelength assigned to the reference and the one for the selected slave.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

What is claimed is:

1. A non-imaging tracking system for tracking a moving object having a longitudinal axis, the tracking system comprising:
   a first laser generating a first laser beam;
   a second laser for generating a second laser beam;
   means for controlling the position of said first and second laser beams;
   an optical system for receiving reflected radiation; and
   means including an integrator for integrating said detector signals to generate an error signal for controlling the position of one or the other of said first and second laser beams under closed loop control.

2. The non-imaging tracking system as recited in claim 1, wherein said integrating means includes means multiplying said detector signals by a predetermined waveform to form a product signal, wherein said product for signal is integrated to form said error signal.

3. The non-imaging tracking system as recited in claim 2, wherein said predetermined waveform is a sinusoidal signal.

4. The non-imaging tracking system as recited in claim 3, further including a filter for filtering said product signal.

5. The non-imaging tracking system as recited in claim 4, wherein said controlling means includes a scan mirror.

6. The non-imaging tracking system as recited in claim 5, wherein said controlling means includes means for controlling said a scan mirror as a function of said error signal forming a control loop.

7. The non-imaging tracking system as recited in claim 6, wherein said controlling means includes a driver for controlling said scan mirror.

* * * * *